United States Patent
Kumar et al.

(10) Patent No.: US 12,140,932 B2
(45) Date of Patent: Nov. 12, 2024

(54) INDUSTRIAL DEVICE SUPPORTING MULTIPLE TIME SYNCHRONIZATION PROTOCOLS

(71) Applicant: ABB Schweiz AG, Baden (CH)

(72) Inventors: Ravish Kumar, Bangalore (IN); Johan Akerberg, Västerås (SE); Jorgen Gade, Västmanland (SE)

(73) Assignee: ABB Schweiz AG, Baden (CH)

( * ) Notice: Subject to any disclaimer, the term of this patent is extended or adjusted under 35 U.S.C. 154(b) by 373 days.

(21) Appl. No.: 17/570,823

(22) Filed: Jan. 7, 2022

(65) Prior Publication Data

US 2022/0128977 A1   Apr. 28, 2022

Related U.S. Application Data

(63) Continuation of application No. PCT/IB2020/056403, filed on Jul. 8, 2020.

(30) Foreign Application Priority Data

Jul. 8, 2019 (IN) .............................. 201941027273

(51) Int. Cl.
*G06F 1/12* (2006.01)
*G05B 19/418* (2006.01)

(52) U.S. Cl.
CPC ..... *G05B 19/4185* (2013.01); *G05B 19/4183* (2013.01); *G05B 19/4188* (2013.01); *G06F 1/12* (2013.01)

(58) Field of Classification Search
CPC ................. G06F 1/32; G06F 1/12; G06F 9/44
See application file for complete search history.

(56) References Cited

U.S. PATENT DOCUMENTS

2010/0082117 A1* 4/2010 Korsberg ........... G05B 19/4148
                                                          700/3
2010/0254225 A1* 10/2010 Schweitzer, III ..... H04J 3/0641
                                                         368/47

(Continued)

FOREIGN PATENT DOCUMENTS

WO    WO 2010/115151 A1    10/2010

OTHER PUBLICATIONS

Ferrari et al., "Evaluation of Time Gateways for Synchronization of Substation Automation Systems," *IEEE Transactions on Instrumentation and Measurement*, 61(10): 2612-2621 (Oct. 10, 2012).

(Continued)

*Primary Examiner* — Keshab R Pandey
(74) *Attorney, Agent, or Firm* — Leydig, Voit & Mayer, Ltd.

(57) ABSTRACT

Systems and methods for supporting multiple time synchronization protocols within an industrial device include obtaining a time reference from each industrial device within the first set of industrial devices and the second set of industrial devices. The time reference provides the basis for synchronization of the clock and other clocks of first set of industrial devices and the second set of industrial devices. A principal time reference is selected from among the time references. Once selected, the principal time reference is correlated with each of the time references obtained from the first set of industrial devices and the second set of industrial devices. With the principal time reference correlated, related communication with the second device may be controlled.

9 Claims, 4 Drawing Sheets

(56) References Cited

U.S. PATENT DOCUMENTS

| | | |
|---|---|---|
| 2012/0179404 A1 | 7/2012 | Lee et al. |
| 2014/0149612 A1* | 5/2014 | Suzuki .................... G06F 13/24 710/48 |
| 2014/0348138 A1* | 11/2014 | Ono .................... H04W 56/001 370/336 |
| 2016/0285574 A1 | 9/2016 | White et al. |
| 2018/0227067 A1 | 8/2018 | Hu et al. |

OTHER PUBLICATIONS

Kirrmann et al., "Coexistence of IEEE 1588, C37.238 and 802.1AS, issues and recommendations," *Precision Clock Synchronization for Measurement Control and Communication (ISPCS), 2012 International IEEE Symposium*, 6 pp. (Sep. 24, 2012).

Loschmidt et al., "A Software Platform Architecture for Multi-Protocol, Hardware Supported Clock Synchronization in Heterogeneous Networks," *10th IEEE International Conference on Emerging Technologies and Factory Automation*, 1: 441-448 (Sep. 19, 2005).

Tournier et al., "Differences and similarities between the audio video bridges and power system profiles for IEEE 1588," *Precision Clock Synchronization for Measurement Control and Communication (ISPCS), 2010 International IEEE Symposium*, p. 19-24 (Sep. 27, 2010).

European Patent Office, International Search Report in International Patent Application No. PCT/IB2020/056403, 5 pp. (Nov. 2, 2020).

European Patent Office, Written Opinion in International Patent Application No. PCT/IB2020/056403, 11 pp. (Nov. 2, 2020).

\* cited by examiner

INDUSTRIAL DEVICE SUPPORTING MULTIPLE TIME SYNCHRONIZATION PROTOCOLS

CROSS-REFERENCE TO RELATED APPLICATIONS

This patent application claims priority to Indian Patent Application Ser. No. 201941027273, filed on Jul. 8, 2019, and to International Patent Application No. PCT/IB2020/056403, filed on Jul. 8, 2020, both of which are incorporated herein in their entirety by reference.

FIELD OF THE DISCLOSURE

The present disclosure generally relates to time synchronization in industrial devices and, more particularly, to industrial devices that support a plurality of time synchronization protocols.

BACKGROUND OF THE DISCLOSURE

An industrial facility may include a plurality of industrial devices, with such devices operating to implement a desired industrial process. The various industrial devices may operate either in conjunction with each other or intermittently. In the latter case, an industrial device may finish with its operation, which then may serve as a trigger or provide an input for another industrial device, within the facility. In such cases, the operation of such industrial devices is synchronized with respect to each other. Synchronization between the different devices ensures that the devices work seamlessly and uninterruptedly with each other, in order to carry out the desired functionalities. In such cases, the synchronization is achieved through various timing protocols enabled through networked systems.

Time synchronization, in general, may be implemented through one or more protocols. Examples of such time synchronization protocols include, but are not limited to, IEEE 802.1AS protocol for Time Sensitive Networking (TSN), Network Time Protocol (NTP), Control Network Clock Synchronization Protocol (CCNP), IEEE 1588 PTP, MMS time source and MB 300 clock sync. Of the present examples, the IEEE 802.1AS Timing and Synchronization protocol is being supported by more recent industrial devices, with the other time synchronization protocols being supported by legacy devices. As is generally known, IEEE 802.1AS Timing and Synchronization Protocol is part of the Time Sensitive Networking (TSN) Standard (and is referred to as TSN synchronization protocol) and is utilized for time synchronization between devices as part of a network of industrial devices. In any industrial network, the different industrial devices may be such that they support different time synchronization protocols. To this end, the industrial devices support multiple time synchronization protocols so that all devices within the industrial network may be synchronized.

BRIEF SUMMARY OF THE INVENTION

The subject matter of the present disclosure relates to systems and methods for supporting multiple time synchronization protocols. The systems and methods described herein may be implemented in an industrial facility and in one or more industrial devices. Examples of such industrial devices include, controllers, communication devices and ethernet switches. In the context of a substation automation, the industrial device may also be an intelligent electronic device (IED). It may be noted that these examples are only indicative and not exhaustive.

BRIEF DESCRIPTION OF THE SEVERAL VIEWS OF THE DRAWING(S)

The features, aspects and advantages of the present subject matter will be better understood with regard to the following description and accompanying figures. It may be noted that the use of the same reference number in different figures indicates similar or identical features and components.

DETAILED DESCRIPTION OF THE INVENTION

Generally, any industrial facility may include a plurality of industrial devices, the operation of which may be synchronized with respect to each other. It may be noted that although the present description is provided from the perspective of industrial devices present within an industrial facility, the same should not be considered as a limitation. The industrial devices may be located at separate locations and may be in communication with each other over a network. The synchronization of the industrial devices is typically implemented through a networked architecture where the industrial devices may receive timing related information from a time server. The timing server may provide such timing information at predefined time intervals. The timing information received from the timing server may then be utilized by the industrial device under consideration based on which their clocks may be synchronized. Time synchronization, in general, may be implemented through one or more protocols.

Supporting such multiple time synchronization protocols is generally complex. For example, time synchronization is achieved through exchange of time synchronization messages. The exchange of such messages is scheduled at specific times to ensure that the clocks of the industrial devices are synchronized. It may happen that the exchange of such messages may be deferred for prioritizing other high priority data traffic, which may result in the industrial devices being out of synch with respect to each other, which loss of synchronization, in certain cases, may impact the industrial process being implemented by the industrial devices. It may also be the case that the industrial devices, which are to handle multiple time synchronization protocols, may not select the appropriate time reference for performing internal operations. As would be understood, such time references are utilized for correcting clock-skew that may develop within the industrial devices.

Furthermore, for multiple time synchronization protocols, different synchronization messages are being continuously communicated through the network. As more number time synchronization protocols involved are generated, a larger number of messages being exchanged is generated, which in turn may utilize more bandwidth. Additionally, different devices may have to be specifically configured to select and utilize the appropriate clock reference for synchronization. In cases where such configuration is not implemented, the time synchronization process may be impacted.

As discussed above, supporting multiple time synchronization protocols is complex and involves overcoming certain challenges, few of which have been identified above, and others may also exist. Such challenges assume further relevance considering that more recently, industrial devices have started supporting the IEEE 802.1AS timing and synchronization protocol (referred to as the TSN synchronization protocol). As is understood, IEEE802.1AS is a peer-to-peer protocol and is a timing and synchronization standard based on the Ethernet standard. Typically, the entire industrial network may include a series of network segments which in turn include a set of industrial devices. Amongst the set of industrial devices, a certain industrial device is designated as a master, which then acts as a basis for time synchronization for other devices within the segment. The master in turn obtains its synchronization information from a grand master node which provides the underlying timing reference for all the masters, and thus the other industrial devices within the industrial network.

In certain cases, a nodal industrial device (such as a time master) may be connected to multiple industrial devices, each of which may be supporting or conforming to different time synchronization protocols. In such cases, the nodal industrial device (which may itself be supporting a time synchronization protocol) may have to routinely communicate to a different time server or a time master, which are responsible for providing time references for devices that are supporting the different time synchronization protocols. For instance, such a nodal industrial device may be supporting a first-time synchronization protocol (e.g., the IEEE 802.1AS protocol) and may act as a time master and may be connected with another industrial device which is part of another network segment, supporting a different time synchronization protocol (e.g., NTP or any other legacy protocol). The nodal industrial device, in addition to supporting its own protocol, also supports the time synchronization protocols of other devices, which may not synchronize directly with the TSN protocol supported industrial devices through TSN synchronization protocol.

Since the nodal industrial device supports multiple time synchronization protocols, it may have to communicate with the corresponding time masters/time servers of the different protocols for obtaining time references based on which time synchronization may be achieved. For example, a nodal device which is supporting the TSN synchronization protocol as well as the NTP protocol, will have to send messages to both the time master of the TSN synchronization protocol as well as the time server for the NTP protocol for obtaining the appropriate time reference information. It should be noted that this would entail utilizing the communication bandwidth. In cases where scheduled communication is to occur, a delay in requesting and receiving time reference information may have an adverse impact on the synchronization of the various industrial device within the industrial network.

To this end, systems and methods for supporting multiple time synchronization protocols within a time synchronization network are described. In one example, a nodal industrial device supporting TSN synchronization protocol (TSN device) receives time references from time masters supporting different time synchronization protocols. A principal time reference from amongst the multiple time references is identified. In one example, the principal time reference is a time reference which conforms with the TSN synchronization protocol. Returning to the present example, the principal time reference and other time references are correlated. Based on the correlation, communication between the nodal industrial device and the other time masters and/or time servers is controlled. In another example, based on the correlation, clock-offsets of any of the industrial devices may be corrected. It may be noted that although the examples provided in the present description have been described in the context of the TSN synchronization protocol, the same may be implemented for other time synchronization protocols without deviating from the scope of the present subject matter. For example, instead of the TSN-based time reference, another principal time reference may be selected. These and other examples are further described in conjunction with FIGS. 1-4.

Figure 1:
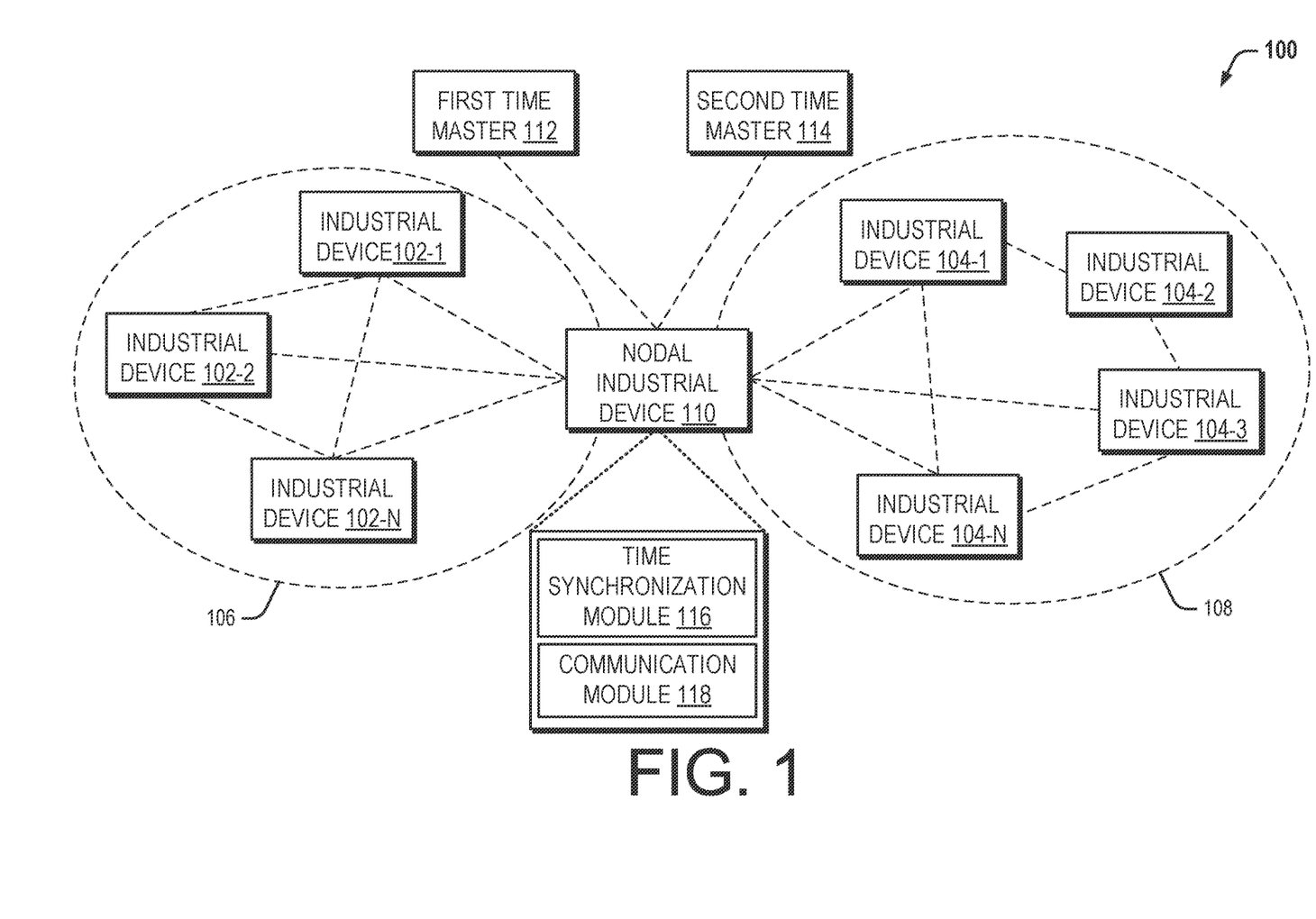
FIG. 1 illustrates an industrial network with a plurality of industrial device for time synchronization, as per one example, in accordance with the disclosure.

FIG. 1 illustrates an example industrial network 100 comprising a first set of industrial device(s) denoted as 102-1, 2, . . . , N, with each of the industrial device(s) 102-1, 2, . . . , N (collectively referred to as industrial devices 102) being connected to each other (either directly or indirectly). Each of the devices supports a primary time synchronization protocol. In one example, the primary time synchronization protocol is the TSN synchronization protocol. The industrial network 100 may further include a second set of industrial device(s) denoted as 104-1, 2 . . . , N. The second plurality of industrial device(s) 104-1, 2 . . . , N (collectively referred to as industrial devices 104) on other hand, support a time synchronization protocol which is different from the TSN synchronization protocol. Examples of such time synchronization protocols may include Network Time Protocol (NTP), Control Network Clock Synchronization Protocol (CCNP), Simple Time Network Protocol (SNTP), IEEE 1588 PTP, and MMS time source. The industrial devices 102, 104 may be considered as defining network segments 106, 108, respectively.

The industrial network may further include a nodal industrial device 110. The nodal industrial device 110 is such that it is connected to the industrial devices 102, 104. In the present example, the nodal industrial device 110 supports the TSN synchronization protocol and may be in a master-slave arrangement with the industrial devices 102 to provide the time references to each of such industrial devices 102. In a similar manner, the nodal industrial device 110 may provide time reference information to the industrial devices 104.

In order to obtain the time references for each of the time synchronization protocols supported by the industrial devices 102 and the industrial devices 104, the nodal industrial device 110 may further communicate with a first time master 112 and a second time master 114. It may be noted that for the present explanation, it is assumed that the industrial devices 104 support the NTP with the second time master 114 providing time references corresponding to the NTP. In case the industrial devices 104 support multiple other time synchronization protocols, the number of such corresponding time masters may accordingly vary.

The nodal industrial device 110 may further include a time synchronization module 116 for supporting multiple time synchronization protocols within the industrial network 100. It may be noted that the network 100 may be a LAN based on the Ethernet standard. The interconnection of the industrial devices 102 and the industrial devices 104 may be through a wired or a wireless connection.

In one example, the time synchronization module 116 obtains time references from the first time master 112 and the second time master 114. Of the received time references, the nodal industrial device 110 may elect a principal time reference. The principal time reference may be considered as a preferred time reference which is then utilized as the basis for time synchronization and synchronization related communication within the industrial network 100. The principal time reference may be elected based on a predefined criterion or may be specifically defined by a network administrator.

Once the principal time reference is selected, the nodal industrial device 110 may then utilize the selected principal time reference for correlating the time references obtained from the first time master 112 and the second time master 114. With the principal time reference correlated with other time references, the communication with second time master 114 and the industrial devices 104, (both of which support a time synchronization protocol different from the TSN synchronization protocol), may be controlled. In one example, the communication with the second time master 114 and any one or more of the industrial devices 104 may be controlled through a communication module 118. It may be noted that the principal time reference may be any other time reference without deviating from the scope of the present subject matter. These aspects and other examples are further described in greater detail with respect to FIG. 2.

Figure 2:
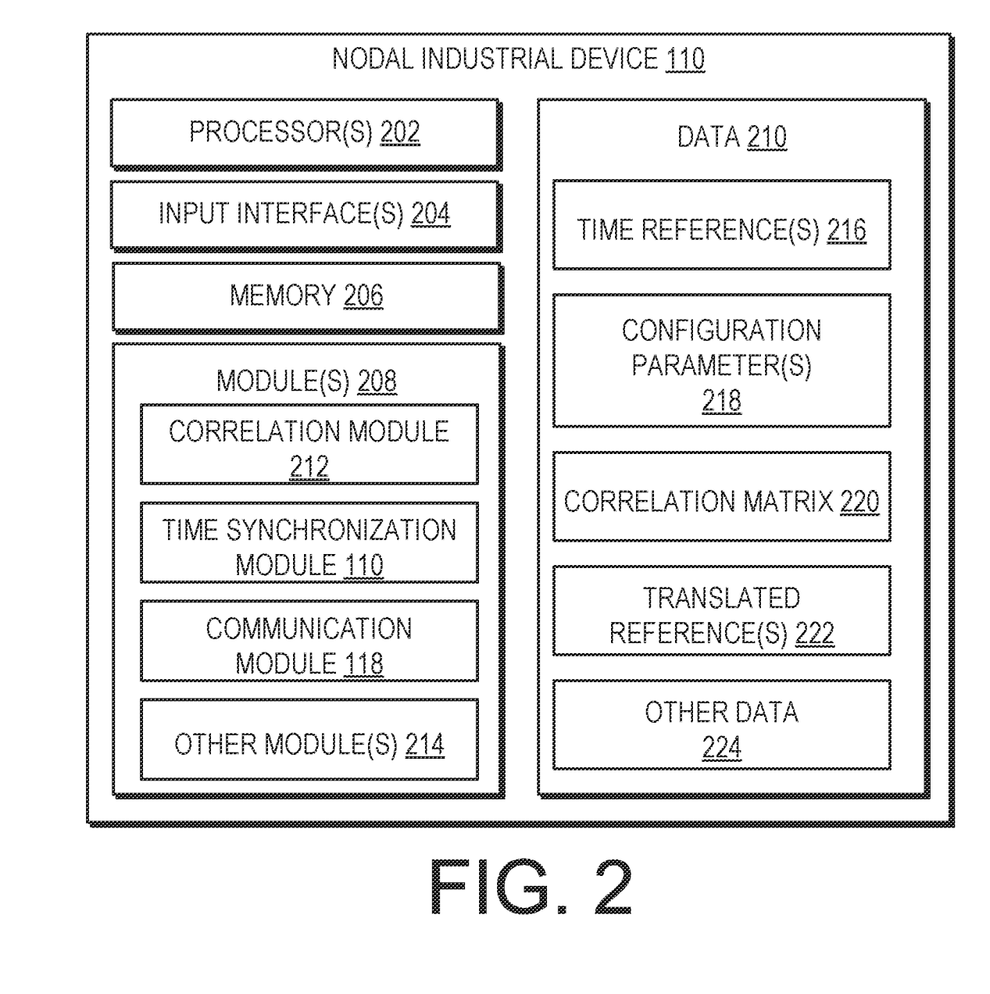
FIG. 2 illustrates a block diagram of an industrial device supporting a plurality of time synchronization protocols, as per one example of the present disclosure.

FIG. 2 describes an example nodal industrial device 110. In the present example, the nodal industrial device 110 supports Time Sensitive Networking (TSN) time synchronization protocol for synchronization across the industrial network 100. The nodal industrial device 110 may be a controller, a communication device, or an ethernet switch. In the context of substation automation, the nodal industrial device 110 may be an intelligent electronic device (IED). In the present example, the nodal industrial device 110 includes processor(s) 202, input interface(s) 204, and memory 206. The processor(s) 202 may also be implemented as signal processor(s), state machine(s), and/or any other device or component that manipulate signals based on operational instructions. The input interface(s) 204 may include a variety of interfaces, for example, interfaces for data input and output, and for exchanging a variety of operational instructions between other systems, such as the systems within the industrial network 100. The input interface(s) 204 may be implemented as either hardware or software. In one example, the input interface(s) 204 may further communicatively couple the nodal industrial device 110 with one or more time masters and/or time servers (e.g., the first time master 112 and second time master 114 as depicted in FIG. 1) for time synchronization.

Memory 206 may store one or more executable instructions, which may be fetched and executed for enabling functionalities that result in supporting multiple time synchronization protocols. An example of such an instruction includes, but is not limited to, firmware for the nodal industrial device 110 for implementing multiple functionalities. The memory 206 may also be used for storing data which may be generated or utilized during the operation of the nodal industrial device 110. The memory 206 may be non-transitory computer-readable medium including, for example, volatile memory, such as RAM, or non-volatile memory such as EPROM, flash memory, and the like.

The nodal industrial device 110 may further include module(s) 208 and data 210. The module(s) 208 may be implemented as a combination of hardware and programming (e.g., program instructions) to implement one or more functionalities. In one example, the module(s) 208 include time synchronization module 116, communication module 118, a correlation module 212 and other module(s) 214 for implementing other functionalities. The data 210 includes information that may be utilized or generated by module(s) 208 during the course of operation of the nodal industrial device 110. In one example, the data 210 includes time reference(s) 216, configuration parameter(s) 218, correlation parameter 220, translated reference(s) 222 and other data 224.

As illustrated in FIG. 1, the nodal industrial device 110 is common between the industrial devices 102 (logically grouped as network segment 106) and the industrial devices 104 (logically grouped as network segment 108). Continuing with the present example, the nodal industrial device 110 in turn is connected to industrial devices 102 as well as the industrial devices 104. The industrial devices 102 collectively conform with the TSN synchronization protocol, which allows the nodal industrial device 110 to communicate with the industrial devices 102, with the nodal industrial device 110 further in communication with the first time master 112 and the second time master 114.

In operation, the nodal industrial device 110 obtains time references from the first time master 112 and the second time master 114, each of which are stored as time reference(s) 216. Since the first time master 112 and the second time master 114 conform to different time synchronization protocols, the time references thus obtained also correspond to the such different time synchronization protocols. In one example, the time reference(s) 216 may include information pertaining to reference clock signal, clock offsets, etc. Such information may be periodically provided to appropriate industrial devices within the network 100 from one or more central systems. Examples of such central systems include, but are not limited to, time servers.

Along with the time reference(s) 216, the nodal industrial device 110 may further include one or more configuration parameter(s) 218 pertaining to the industrial devices 104, which conform to the time synchronization protocols other than the protocol being followed by the nodal industrial device 110, i.e., the TSN synchronization protocol. The configuration parameter(s) 218 may be considered as defining parameters that are utilized for synchronization. In one example, the configuration parameter(s) 218 may include a server address, update rate, etc. Other parameters are also possible without impacting the scope of the present subject matter.

Once the time reference(s) 216 are obtained, the time synchronization module 116 selects a principal time reference from amongst the time reference(s) 216. The principal time reference may be selected based on a variety of criteria, such as accuracy, how frequently it is updated, etc. Alternatively, the principal time reference may be prescribed by an administrator overseeing the time synchronization processes within the network 100. In the present example, the principal time reference is a TSN-based time reference (referred to as a TSN reference). It may be noted that the principal time reference may be any time reference which conforms to any other time synchronization protocol, e.g., Network Time Protocol (NTP), Control Network Clock Synchronization Protocol (CCNP), Simple Time Network Protocol (SNTP), IEEE 1588 PTP, and MMS time source.

For the foregoing example, the principal time reference is the TSN-based time reference. It may also be noted that any other time reference (pertaining to another time synchronization protocol) may also be selected as the principal time reference without deviating from the scope of the present subject matter. In one example, the selection of the principal time reference may be based on a variety of conditions. It is generally considered that time synchronization protocols that have a high update rate may tend to provide more accurate time references. In such cases, time references of protocols having a higher update rate may be selected as the principal time reference. Any other condition may also be utilized for selecting the principal time reference from amongst the time reference(s) 216.

Once the principal time reference is identified and selected, the time synchronization module 116 may correlate the principal time reference with the other time reference(s) 216. It may be noted that for the present example, since only the second time master 114 is present, the time reference(s) 216 may include time reference from the second time master 114. However, the time reference(s) 216 may include additional time references in case the industrial devices 104 conform to multiple time synchronization protocols (which are different from the TSN synchronization protocol).

The selected principal time reference is correlated with the other time reference(s) 216 by the correlation module 212. In one example, the correlation may be based on one or more estimated offsets. The correlation, as would be understood, provides an interrelation between the principal time reference and the time reference(s) 216. In another example, based on the correlation between the principal time reference and the time reference(s) 216, correlation parameter 220 may be generated. For generating the correlation parameter 220, the time synchronization module 116 may determine a relation between the time references obtained from the first time master 112 and the second time master 114. For example, the correlation may between such example time references may be represented through the following equation:

$$\text{Equation: } TS_1 \cdot TimeRef = TS_2 \cdot TimeRef + \Delta t$$

wherein the $TS_1$ and $TS_2$ specify the respective time references of two time synchronization protocols and $\Delta t$ is a difference between two example time references. In the manner as described above, similar relations between other time synchronization protocols may also be derived, which collectively may be realized as the correlation parameter 220.

In another example, the principal time reference may also be used for correcting any clock-offsets that may occur in any of the industrial devices 104. Since the correlation parameter 220 provides a correlation between the time references of different time synchronization protocols (i.e., both the TSN synchronization protocol and the non-TSN protocols), the correlation parameter 220 may be used for correcting the clock-slew which may be present in any one of the industrial devices 104. For example, based on a correction factor utilized for correcting the clock-slew in a TSN device (e.g., nodal industrial device 110), a corresponding correction factor for correcting the clock-slew of devices supporting a non-TSN protocol may be determined through the correlation parameter 220. Once the corresponding correction factor is determined, the same may be utilized for correcting the clock slew in devices supporting non-TSN protocol (i.e., the industrial devices 104).

In another example, the nodal industrial device 110 may control and manage synchronization related communication with other devices, such as industrial devices 104, based on the principal time reference and the correlation parameter 220. For example, the time synchronization module 116 may modify or alter one or more configuration parameter(s) 218, which in turn changes the various characteristics of the synchronization related communication implemented within the industrial network 100.

Various examples of controlling synchronization related communication are now explained. It should be noted that such controlling of communication is based on the principal time reference and based on the correlation between the principal time reference and the time reference(s) 216. The examples as depicted are only exemplary, with other examples also being possible. Such examples would also fall within the scope of the present subject matter, as claimed.

As mentioned previously, the nodal industrial device 110 was to communicate with the first time master 112 and the second time master 114 for obtaining time reference and other information at intervals prescribed under the respective time synchronization protocols. In the present instance, the time synchronization module 116 may effectively disable the time synchronization protocol being supported by the nodal industrial device 110. This aspect is explained with respect to an example scenario with the nodal industrial device 110 communicating with the second time master 114 that provides the time synchronization information for industrial device 104-1, which in turn supports Network Time Protocol (NTP). Generally, the nodal industrial device 110 would, for the purpose of time synchronization, would periodically communicate with an appropriate time server (e.g., second time master 114) for obtaining a time reference as per the NTP protocol. The periodicity with which the nodal industrial device 110 may communicate with its respective time server to obtain the appropriate time reference depends on the parameters specified under NTP. To this end, typically, the nodal industrial device 110 utilizes a certain amount of bandwidth at such periodic time intervals for communicating with its time server to obtain the time reference for synchronization.

In the present example, the time synchronization module 116 may determine the pertinent time synchronization protocol, i.e., NTP, associated with the second time master 114. With the time synchronization protocol for the industrial device 104-1 identified, the time synchronization module 116 may translate the principal time reference into a target time reference based on the correlation parameter 220. The target time reference may correspond to the time synchronization protocol pertaining to the second time master 114 and the industrial device 104-1. In one example, the time synchronization module 116 may translate TSN-based time reference (which is the principal time reference), to a NTP based time reference. The target time reference is eventually stored as one or more translated reference(s) 222. The appropriate translated reference(s) 222 may then be communicated to the industrial device 104-1, based on which time synchronization may be implemented for the industrial device 104-1.

As would be noted, the translated reference(s) 222 (which is/are based on the principal time reference and correlation parameter 220), is/are likely to provide a more accurate basis for time synchronization and for implementing synchronization related communication by the nodal industrial device 110, as compared the NTP-based time reference. Since each translated reference 222 conforms with NTP, the translated reference(s) 222 may then be used as a time reference by the industrial device 104-1 for synchronization and for synchronization related communication. If the industrial device 104-1 is to use the translated reference(s) 222, the nodal industrial device 110 may no longer need to pull time reference and/or other information from its corresponding time server, i.e., second time master 114. In this manner, the bandwidth which would have been utilized for pulling such NTP-based time references is no longer utilized. Correspondingly, for the nodal industrial device 110, any NTP-based communication may be disabled with the industrial device 104-1 relying on the translated reference(s) 222 for time synchronization and for synchronization related communication. Similar approaches may also be followed for other industrial devices 104 which support non-TSN protocol. In this fashion, a considerable amount of bandwidth may be conserved with each of such industrial devices 104 relying on the translated reference(s) 222 instead of regularly polling their respective time servers for time references.

In yet another example, the message exchange rate for the nodal industrial device 110 with second time master 114 may be updated. For example, the nodal industrial device 110, which also supports NTP, may periodically exchange time synchronization messages with the second time master 114 at predefined time intervals for obtaining synchronization information. Generally, TSN synchronization protocol is considered to provide a more accurate time reference as compared to the NTP. Therefore, if the nodal industrial device 110 relies on time references determined based on TSN time synchronization protocol, such time references are likely to provide a better basis for synchronization and for effecting time synchronization for the industrial devices 104. As explained in conjunction with the previous example, since nodal industrial device 110 may now rely on the translated reference(s) 222, the rate at which such references are polled from the nodal industrial device 110 may be reduced. Since the nodal industrial device 110 now does not exchange messages at a more frequent rate, the bandwidth may be further conserved and utilized for data traffic and/or other communication.

In a further example, the time synchronization module 116 may request the network controller to reschedule traffic to release bandwidth used for exchanging messages for synchronization and for other related synchronization related communication. It would be understood that since the synchronization and the synchronization related communications are being implemented based on the principal time reference and the correlation parameter 220 and at lower frequency as before, the bandwidth that was previously utilized for synchronization and for synchronization related communication may be used for other data communication. This further reduces the load on the communication network resources within the industrial network 100.

Figure 3:
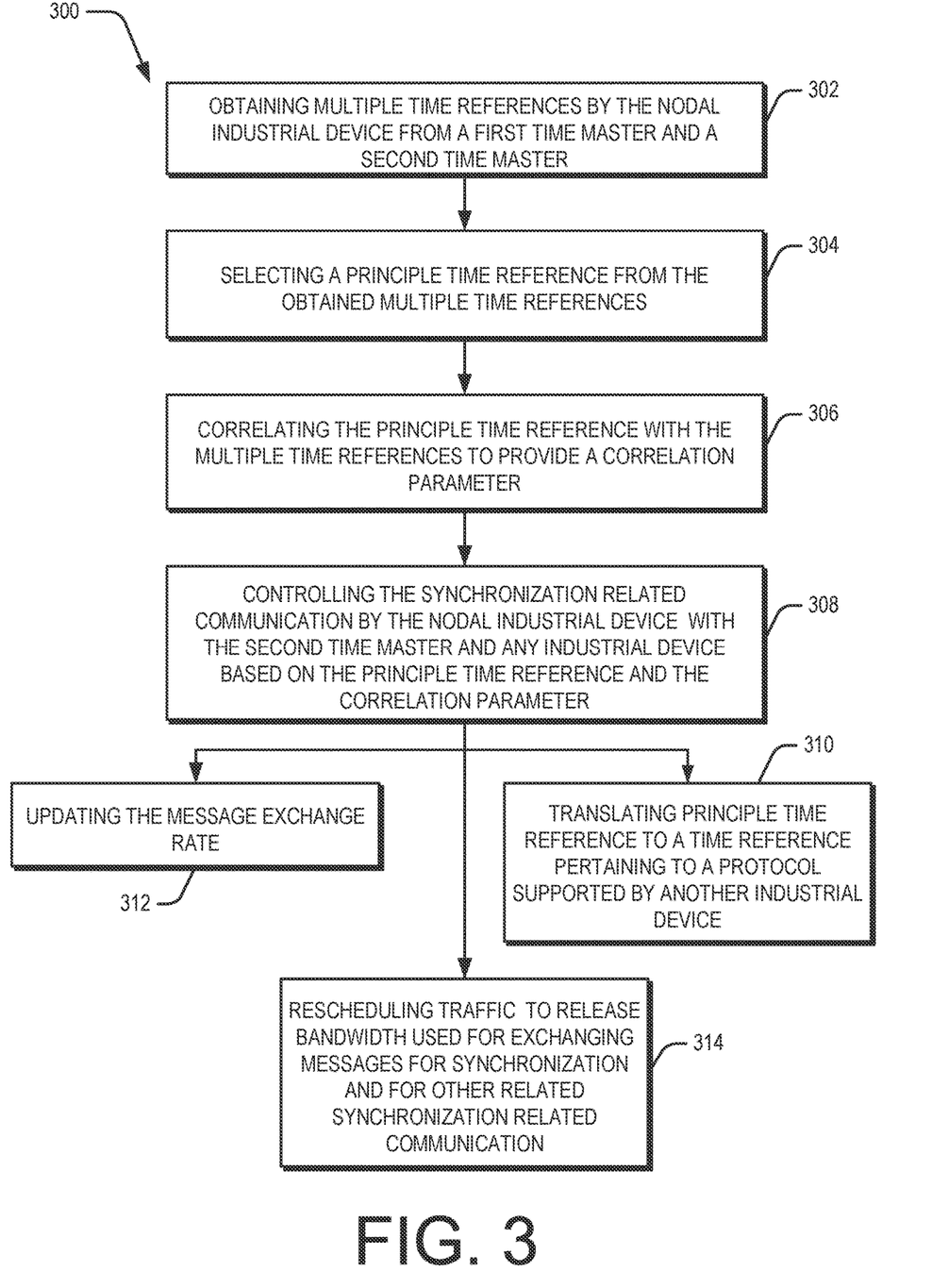
FIG. 3 illustrates example method implemented by industrial devices supporting a plurality of time synchronization protocols in accordance with the disclosure.

FIG. 3 illustrates an exemplary method 300 for supporting multiple time synchronization protocols by an industrial device, such as the nodal industrial device 110 (as described in conjunction with FIG. 1). Examples of such industrial devices, such as the nodal industrial device 110, include controllers, communication devices and ethernet switches. In the context of a substation automation, the industrial device may also be an intelligent electronic device (IED). It may be noted that these examples are only indicative and not exhaustive. Returning to the method 300, the order in which the method is described is not intended to be construed as a limitation, and any number of the described method blocks may be combined in any order to implement the aforementioned methods, or an alternative method. Furthermore, method 300 may be implemented by processing resource or computing device(s) through any suitable hardware, non-transitory machine-readable program instructions, or combination thereof, or through logical circuitry.

In certain circumstances, program instructions stored in a non-transitory computer readable medium when executed may implement method 300 through the respective devices, as will be readily understood. The non-transitory computer readable medium may include, for example, digital memories, magnetic storage media, such as one or more magnetic disks and magnetic tapes, hard drives, or optically readable digital data storage media. Although, the method 300 is described below with reference to the industrial devices, as described above, other suitable systems for the execution of these methods can be utilized. Additionally, implementation of these methods is not limited to such examples.

At block 302, multiple time references from one or more time masters and/or time servers, are obtained. For example, the nodal industrial device 110 obtains time references from the first time master 112 and the second time master 114, which are stored as time reference(s) 216. As explained previously, the first time master 112 may provide time references which conform to a primary time synchronization protocol, which is also the protocol followed by the nodal industrial device 110. It may be noted that the time reference(s) 216 may include information pertaining to reference clock signal, clock offsets, etc. In the present example, the nodal industrial device 110 may be considered as supporting a TSN time synchronization protocol, with the nodal industrial device 110 being communicatively coupled to the industrial devices 104, which in turn support a time synchronization protocol, other than the TSN time synchronization protocol.

At block 304, a principal time reference is selected from the plurality of obtained time references. For example, once the time reference(s) 216 are obtained, the time synchronization module 116 selects a principal time reference from amongst the time reference(s) 216. The principal time reference may be selected based on a variety of criteria, such as accuracy, how frequently it is updated, etc., or may be predefined by the administrator overseeing the time synchronization processes within the network 100. In the present example, the principal time reference is a TSN-based time reference (referred to as a TSN reference). It may be noted that the principal time reference may be any time reference which conforms to any other time synchronization protocol, e.g., Network Time Protocol (NTP), Control Network Clock Synchronization Protocol (CCNP), Simple Time Network Protocol (SNTP), IEEE 1588 PTP, and MMS time source, depending on whether such time synchronization protocols fulfill the selection criterion. The selection of the principal time reference may be based on a variety of conditions. For example, time references of protocols having a higher update rate may be selected as the principal time reference. In one example, the principal time reference is the TSN-based time reference.

At block 306, the principal time reference is correlated with the time references collected from the various industrial devices. For example, for the identified principal time reference, the time synchronization module 116 may correlate the principal time reference with other references available within the time reference(s) 216 stored in the nodal industrial device 110. The correlation of the principal time reference and the time reference(s) 216 may yield a correlation parameter 220. For generating the correlation parameter 220, the time synchronization module 116 may determine a relation between the time references of the obtained time synchronization protocols. For example, the correlation may between such example time references may be represented through the following equation:

$$\text{Equation: } TS_1\cdot TimeRef = TS_2\cdot TimeRef + \Delta t,$$

wherein the $TS_1$ and $TS_2$ specify the respective time references of two time synchronization protocols and $\Delta t$ is a difference between two example time references. In the manner as described above, similar relations between other time synchronization protocols may also be derived, which collectively may be realized as the correlation parameter 220.

At block 308, based on the principal time reference and the correlation of the principal time reference with other time references, the synchronization related communication by the nodal industrial device may be controlled. For example, the time synchronization module 116 may control and manage synchronization related communication of the nodal industrial device 110 with the second time master 114, based on the principal time reference and the correlation parameter 220. To this end, the time synchronization module 116 may modify or alter one or more configuration parameter(s) 218 of the nodal industrial device 110. This, in turn, changes the various characteristics of the synchronization related communication implemented within the industrial network 100. The synchronization related communication, once controlled, may result in efficient utilization of the resources of the network 100. Few examples are depicted below, which form part of the step implemented at block 308. These examples are depicted as additional blocks 310-314, following the block 308. It should be noted that it is not necessary that all the steps depicted may be performed. Any one or all the steps may be performed without limiting the scope of the present subject matter.

Continuing with the step described with respect to block 308, the principal time reference may be translated to a time reference pertaining to a protocol supported by another industrial device (block 310). The time synchronization module 116 may determine the pertinent time synchronization protocol, i.e., NTP, pertinent to one of the devices within the industrial devices 104, say the industrial device 104-1. Corresponding to the retrieved time reference, the principal time reference is translated into a target time reference. The target time reference may correspond to the time reference pertaining to the industrial device 104-1. In one example, the time synchronization module 116 may translate TSN-based time reference (which is the principal time reference), to a NTP based time reference, based on the correlation parameter 220. Since the translated reference(s) 222 conforms with NTP, the translated reference(s) 222 may then be used as a time reference by the nodal industrial device 110 to provide as a time reference to industrial device 104-1 for synchronization and for synchronization related communication. It is contemplated that the time reference for the industrial device 104-1 is not obtained by polling the second time master 114, thereby conserving bandwidth.

In yet another example, the message exchange rate may be updated (block 312). For example, the nodal industrial device 110 may exchange time synchronization messages required under NTP protocol with the second time master 114 at a predefined frequency to obtain time references. Generally, TSN synchronization protocol is considered to provide a more accurate time reference as compared to the NTP. Therefore, if the nodal industrial device 110 is to rely on time references based on TSN synchronization protocol, such time references are likely to provide a better basis for synchronization for the industrial device 104-1. To this end, the nodal industrial device 110 may poll the second time master 114 less frequently in comparison to the predefined frequency.

In a further example, traffic may be rescheduled to release bandwidth used for exchanging messages for synchronization and for other related synchronization related communication (block 314). For example, the time synchronization module 116 may reschedule traffic to release bandwidth used for exchanging messages for synchronization and for other related synchronization related communication. It would be understood that since the synchronization and the synchronization related communication is being implemented based on the principal time reference and the correlation parameter 220 and at lower frequency than before, the bandwidth which was previously utilized for synchronization and for synchronization related communication may be used for other data communication. This further reduces the load on the communication network resources within the industrial network 100

Figure 4:
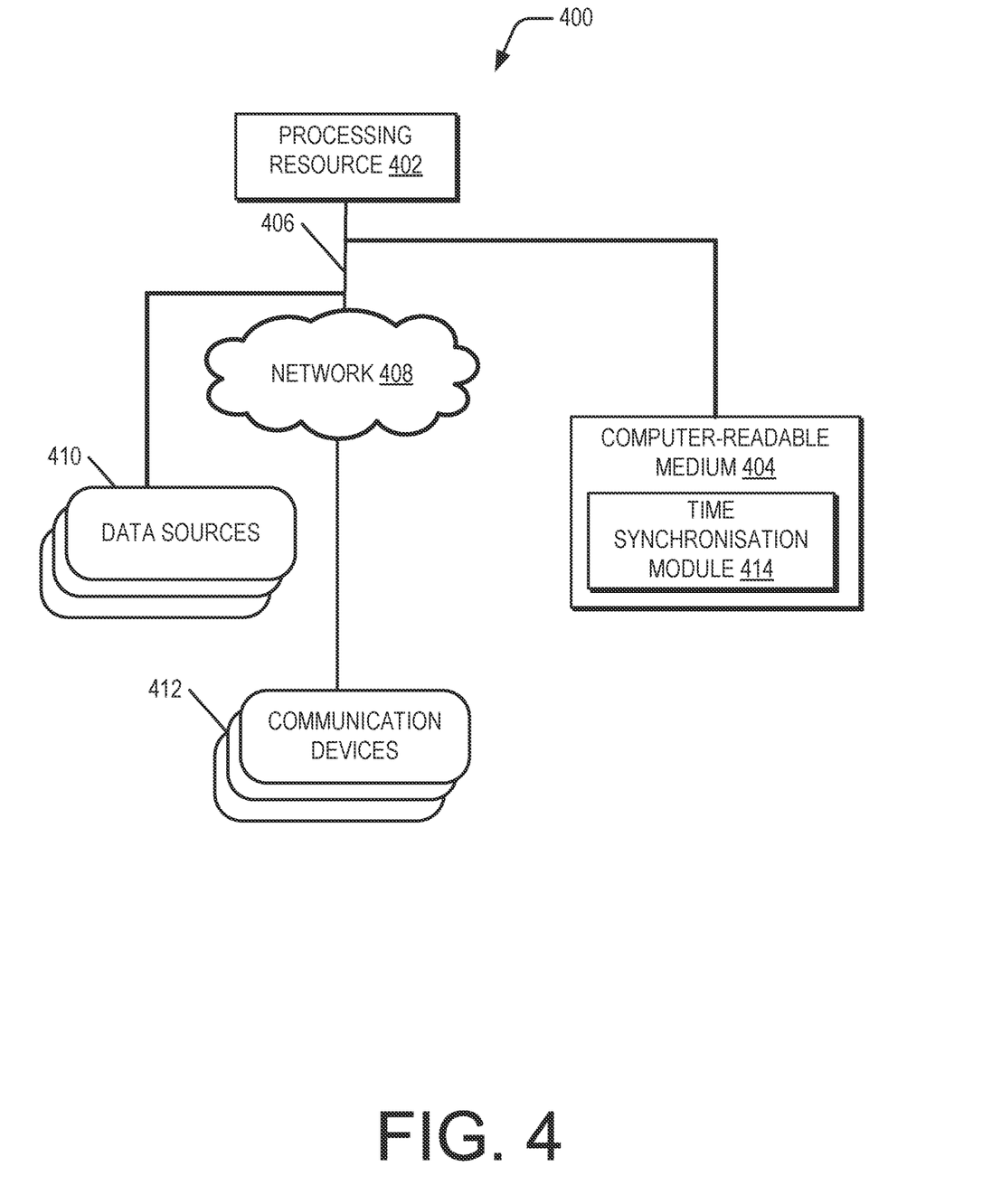
FIG. 4 illustrates a block diagram of an example networked environment implementing a non-transitory computer-readable medium for causing an example industrial device to support multiple time synchronization protocols, in accordance with the disclosure.

FIG. 4 illustrates a system environment 400 for supporting multiple time synchronization protocols by an industrial device, according to one exemplary embodiment. The system environment 400 may comprise at least a portion of a public networking environment or a private networking environment, or a combination thereof. In one example, the system environment 400 includes a processing resource 402 communicatively coupled to a computer readable medium 404 through a communication link 406.

For example, the processing resource 402 can include one or more processors of a computing device, such as processor(s) 202 of nodal industrial device 110. The computer readable medium 404 can be, for example, an internal memory device of the computing device or an external memory device. In one example, the communication link 406 may be a direct communication link, such as any memory read/write interface. In another example, the communication link 406 may be an indirect communication link, such as a network interface. In such a case, the processing resource 402 can access the computer readable medium 404 through a network 408. The network 408 may be a single network or a combination of multiple networks and may use a variety of different communication protocols.

The processing resource 402 and the computer readable medium 404 may also be coupled to data sources 410 through the communication link 406, and/or to networked devices 412 over the network 408. The coupling with the data sources 410 enables receiving the relevant data in an offline environment, and the coupling with the networked devices 412 enables receiving the data in an online environment.

In one example, the computer readable medium 404 includes a set of computer readable program instructions that implementing a time synchronization module 116. The set of computer readable program instructions can be accessed by the processing resource 402 through the communication link 406 and subsequently executed to fetch data from data sources 410. When executed by processing resource 402, the program instructions of the time synchronization module 116 may implement the functionalities described above in relation to the nodal industrial device 110.

In operation, the time synchronization module 414 obtains time references from the different time masters, e.g., the first time master 112 and the second time master 114. As would be understood, the time reference provides the basis for synchronization of the clock and other clocks of first set of industrial devices and the second set of industrial devices.

In one example, the time references obtained from the different time masters may be stored within the nodal industrial device 110, for example as time reference(s) 216. From amongst the time reference(s) 216, the time synchronization module 414 may then select a principal time reference. In one example, selection of the principal time reference may be based on a set of predefined criteria or may be prescribed by a system administrator. Once the time synchronization module 414 identifies the principal time reference, the principal time reference may be correlated with other time reference(s) 216.

With the principal time reference and the time reference(s) 216 correlated, the time synchronization module 414 may then control synchronization related communication with one or more devices, e.g., industrial device 104-1 within the industrial devices 104. The control of the synchronization related communication may be based on the correlation parameters, e.g., correlation parameter 220 and the principal time reference.

For controlling the synchronization related communication, the time synchronization module 414 may, in turn, obtain and provide translated reference(s) 222 to a second device, say industrial device 104-1, instead of retrieving time references from a time master, such as the second time master 114. The translated reference(s) 222 are such that they conform with the time synchronization protocol supported by industrial device 104-1. The industrial device 104-1 may then utilize the translated reference(s) 222 for implementing synchronization related communication. In another example, the time synchronization module 414 may also update a message exchange rate for synchronization related communication. In another example, the time synchronization module 414 may also reschedule traffic pertaining to the time synchronization operation between the nodal industrial device 110 and the industrial devices 104.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A nodal industrial device for time synchronization in an industrial network, wherein the nodal industrial device is one of a first set of industrial devices and is connected to a second device from amongst a second set of industrial devices, with the first set of industrial devices supporting a primary time synchronization protocol, and the second set of industrial devices supporting at least one other time synchronization protocol, which is different from the primary time synchronization protocol and with the nodal industrial device supporting the primary time synchronization protocol and the other time synchronization protocol, the nodal industrial device comprising:

a processor configured to:
  couple the nodal industrial device with a first time master corresponding to the primary time synchronization protocol and a second time master corresponding to the second time synchronization protocol;
  obtain a plurality of time references, wherein the plurality of time references are obtained from one of the first time master and any one of the devices from amongst the first set of industrial devices, and from at least the second time master;
  select a principal time reference from amongst the obtained plurality of time references;
  correlate the plurality of time references based on the principal time reference; and
  control communication related to time synchronization with the second time master based on correlation between the principal time reference and the other time references,
  wherein the processor configured for synchronization related communication with the second time master is further configured to:
    translate time reference obtained from the second time master based on the correlation of the principal time reference to obtain a translated reference;
    provide the translated reference to an industrial device within the second set of industrial devices for time-related synchronization; and further disable synchronization related communication with the second time master in response to obtaining the translated reference.

2. The nodal industrial device recited in claim 1, wherein the processor correlates the plurality of time references to generate a correlation parameter, the correlation parameter comprising one of:
   a time difference between the primary time synchronization protocol and the other time synchronization protocols,
   a frequency of correction pertaining to the primary time synchronization protocol and the other time synchronization protocol, and
   an accuracy of clock provided within the first set of industrial devices and the second set of industrial devices.

3. The nodal industrial device recited in claim 2, wherein the correlation parameter correlates the principal time reference to at least the time reference from the second time master.

4. The nodal industrial device recited in claim 1, wherein the primary time synchronization protocol is an IEEE 802.1AS timing and synchronization protocol, and wherein the principal time reference is a time reference based on the IEEE 802.1AS protocol.

5. The nodal industrial device recited in claim 1, wherein the processor is further configured to control the communication pertaining to one of the time synchronization protocols by one of:
   updating a message exchange rate for synchronization related communication with the second time master; and
   rescheduling traffic pertaining to the time synchronization operation in conformance with the updated message exchange rate.

6. The nodal industrial device recited in claim 2, wherein the processor is configured to adjust a clock-skew error based on the correlation parameter.

7. The nodal industrial device recited in claim 1, wherein the time synchronization protocols supported by the second set of industrial devices is one of Simple Time Network Protocol (SNTP), IEEE 1588 PTP, and MMS time source.

8. A method implemented by a nodal industrial device supporting a primary time synchronization protocol and an other time synchronization protocol for time synchronization in an industrial network, wherein the nodal industrial device is one of a first set of industrial devices and is connected to a second device from amongst a second set of industrial devices, with the first set of industrial devices supporting a primary time synchronization protocol, and the second set of industrial devices supporting at least one other time synchronization protocol, wherein the one other time synchronization protocol is different from the primary time synchronization protocol, the method comprising:
   obtaining time references from a first time master and from at least one second time master, wherein the first time master and the at least one second time master are coupled to the nodal industrial device, wherein the time references provide a basis for synchronization of a clock of each of the first set of industrial devices and other clocks of each of the second set of industrial devices;
   selecting a principal time reference from amongst the obtained time references;
   correlating the obtained time references based on the principal time reference;
   controlling synchronization related communication with the at least one second time master based on one of the correlating and the principal time reference by:
      translating time reference obtained from the second time master based on the correlation of the principal time reference to obtain a translated reference;
      providing the translated reference to an industrial device within the second set of industrial devices for time-related synchronization; and
      further disabling synchronization related communication with the second time master in response to obtaining the translated reference.

9. A non-transitory computer-readable storage medium comprising non-transitory program instructions for execution within a nodal industrial device supporting a primary time synchronization protocol and an other time synchronization protocol for time synchronization in an industrial network, wherein the nodal industrial device is one of a first set of industrial devices and is connected to a second device from amongst a second set of industrial devices, wherein the first set of industrial devices supports a primary time synchronization protocol, and wherein the second set of industrial devices supports at least one other time synchronization protocol which is different from the primary time synchronization protocol, cause the nodal industrial device to:
   obtain time references from a first time master and at least one second time master, wherein the first time master and the at least one second time master are coupled to the nodal industrial device, wherein the time references provide a basis for synchronization of a clock of each of the first set of industrial devices and other clocks of each of the second set of industrial devices;
   select a principal time reference from amongst the obtained time references;
   correlate the obtained time references based on the principal time reference; and
   control synchronization related communication with the at least one second time master based on one of the correlation of the obtained time references and the principal time reference, wherein to control synchronization related communication further comprises one of:
      generate a translated reference for the second device, wherein the second device is configured to utilize the translated reference for time synchronization;
      update a message exchange rate with the at least one second time master for synchronization related communication; and
      reschedule traffic pertaining to the time synchronization operation for the first set of industrial devices and the second set of industrial devices.

* * * * *